US009262910B1

(12) United States Patent
Anvari

(10) Patent No.: US 9,262,910 B1
(45) Date of Patent: Feb. 16, 2016

(54) PRECISION WIRELESS SENSOR

(71) Applicant: Kiomars Anvari, Walnut Creek, CA (US)

(72) Inventor: Kiomars Anvari, Walnut Creek, CA (US)

(73) Assignee: Kiomars Anvari, Walnut Creek, CA (US)

( * ) Notice: Subject to any disclaimer, the term of this patent is extended or adjusted under 35 U.S.C. 154(b) by 416 days.

(21) Appl. No.: 13/694,968

(22) Filed: Jan. 10, 2013

(51) Int. Cl.
*H04Q 9/00* (2006.01)
*G08C 17/02* (2006.01)

(52) U.S. Cl.
CPC ...................................... *G08C 17/02* (2013.01)

(58) Field of Classification Search
CPC .......... H04L 7/042; H04B 1/28; H04B 1/707; G08B 13/2491; G01B 7/14; G01S 13/88; G01S 13/583; G01S 5/0289; E21F 17/18; G08C 17/02; G01D 5/24404; G01D 5/24414; G06F 8/10; G06F 17/5022; G06F 17/5045
USPC ............... 340/870.01–870.44, 501, 516, 517, 340/518, 519, 520, 526, 534, 538.11, 340/538.15, 539.21, 539.22, 539.26, 340/539.27, 539.28, 540, 546, 545.2, 547, 340/548, 549, 545.3, 545.4, 545.5, 600, 340/601, 602–635
See application file for complete search history.

(56) References Cited

U.S. PATENT DOCUMENTS

| 6,580,374 B2* | 6/2003 | Schrage ......................... 340/933 |
| 2005/0156780 A1* | 7/2005 | Bonthron et al. ............. 342/107 |
| 2005/0220218 A1* | 10/2005 | Jensen et al. .................. 375/302 |
| 2011/0205033 A1* | 8/2011 | Bandyopadhyay et al. .......................... 340/10.51 |

* cited by examiner

*Primary Examiner* — Mancil Littlejohn, Jr.

(57) ABSTRACT

A precision wireless sensor for monitoring the environment surrounding the sensor. The precision wireless sensor comprises a wireless transmitter, a wireless receiver with bank of down converters and bank of correlators, a receive signal strength measurement circuit, and a control processor with timing counter. The control processor utilizes the received information, received signal strength and timing information to estimate and calculate various environmental parameters which can be used to activate different devices.

9 Claims, 8 Drawing Sheets

PRECISION WIRELESS SENSOR

BACKGROUND

Smart environments represent the next evolutionary development step in building, utilities, industrial, home, shipboard, and transportation systems automation. Like any sentient organism, the smart environment relies first and foremost on sensory data from the real world. Sensory data comes from multiple sensors of different modalities in distributed locations. The smart environment needs information about its surroundings as well as about its internal workings.

The challenges in the hierarchy of: detecting the relevant quantities, monitoring and collecting the data, assessing and evaluating the information, and performing decision-making and alarm functions are enormous. The information needed by smart environments is provided by Distributed Wireless Sensor Networks, which are responsible for sensing as well as for the first stages of the processing hierarchy. The importance of sensor networks is highlighted by the number of recent initiatives.

Wireless sensors are standard measurement tools equipped with transmitters to convert signals from a control processor into a radio transmission. The radio signal is interpreted by a receiver which then detects the received signal and sends it to a processor to be analyzed. There are a number of items to consider when selecting a wireless measurement instrument.

Type of Measurement:

It is important to understand what is being measured. Wireless transmitters (which incorporate wireless process measurement and control) typically have a unique function. Sensors are specifically designed for speed, distance, flow, etc., and must be selected accordingly.

Accuracy and Response Time:

How accurate does the measurement need to be, and how quickly should the measurement be updated? Most wireless sensors are as accurate as their wired counterparts; however a signal is typically transmitted every few seconds to preserve battery power.

Range:

The range of wireless sensors varies widely. Some are designed for short-range, indoor applications of a few hundred feet, while other sensors can transmit data to a receiver located miles away. Regardless of the sensors capability, the range of a wireless signal is always limited by obstructions. Transmitting through machines, walls, and structures degrades signal strength and reduces range capability. As a result, the range of a transmitter located indoors is typically significantly less than the same transmitter broadcasting outside in wide open field.

Frequency:

The frequency of radio transmission is also important to consider. Laws vary by country and region as to which parts of the wireless spectrum are available for use without specific licenses. Accuracy and response time in certain application depends on operating frequency, the higher the frequency the more accurate the measurement of certain parameters.

Various components of a wireless sensor system are;

Transmitters:

In certain applications the transmitters use particular signals to send via radio waves to a receiver.

Receiver:

receives and interpret the wireless data. The receiver 'reads' a radio signal, utilize it to estimate and calculate certain parameters, and then send them to a controller to make decision.

Controller:

receives and analyze data from wireless receiver. However, the wireless controller is also able to manipulate a process based on the data being measured. For example, if a furnace becomes too hot, a controller can recognize the increased temperature and send a signal to turn off some heating elements.

The drawings referred to in this description should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Figure 1:
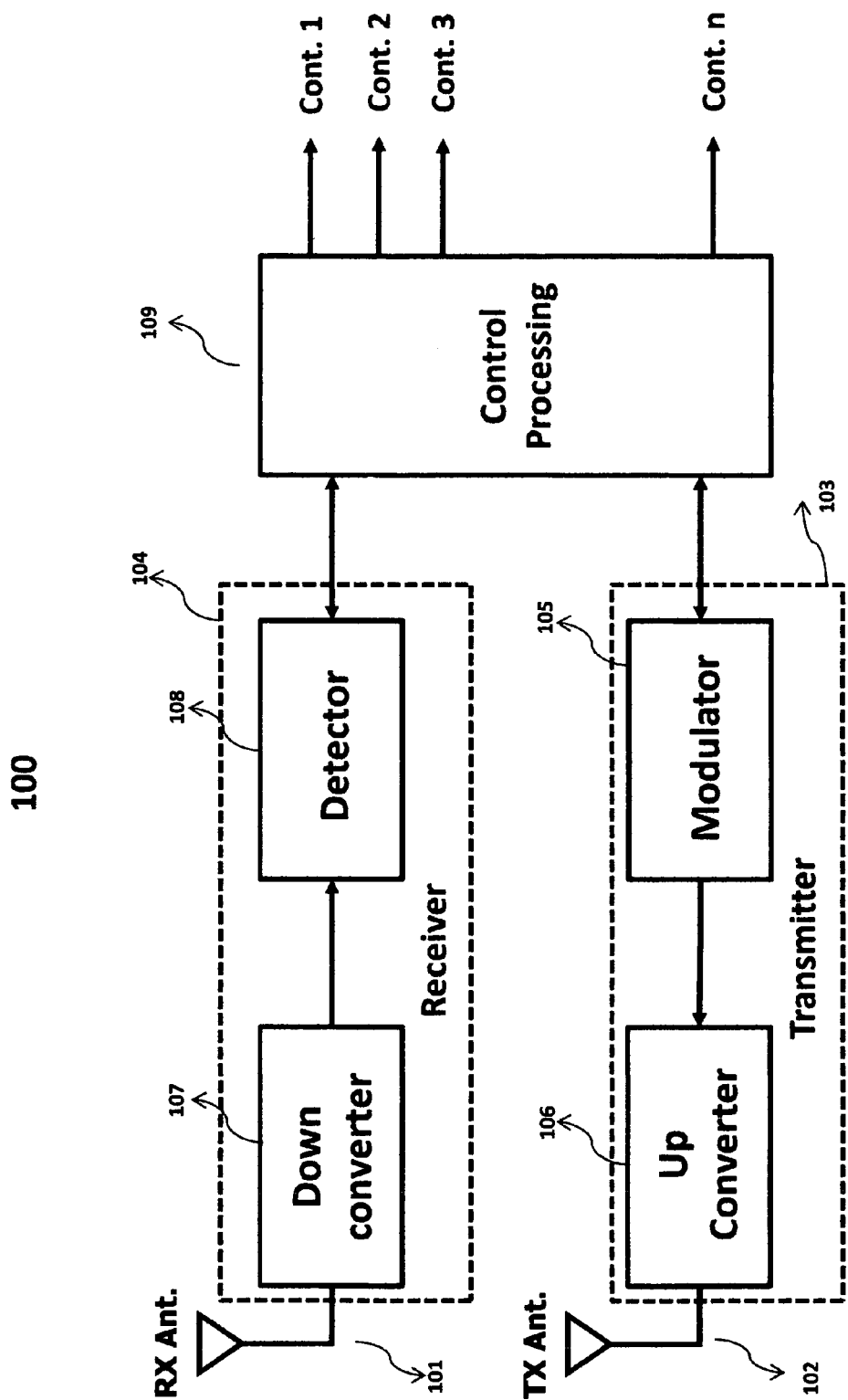
FIG. 1 illustrates an embodiment of a wireless sensing system.

FIG. 1 depicts an embodiment of wireless sensor 100. In general, wireless sensor 100 facilitates estimation and calculation of certain parameters by transmitting a coded signal generated by a control processor 109 through a transmitter 103 and antenna 102 and then receiving the attenuated version of the same coded signal by an antenna 101 and receiver 104. For example, control processor 109 creates a random transmit pattern, send it to transmitter 103 for modulation by modulator 105 and up conversion to radio frequency by up convertor 106 and transmission through antenna 102. Then the reflected transmit signal from an object in the environment is received by antenna 101, down converted by down convertor 107, the transmitted pattern detected by detector 108 and send an indication to control processor 109. The down converter 107 also facilitates measurement of received signal strength to provide to control processor 109.

Wireless sensor system 100 includes, among other things, control processor 109, transmitter 103, transmit antenna 102, receive antenna 101, and receiver 104.

In one embodiment, control processor 109, transmit antenna 102, transmitter 103, receive antenna 101, and receiver 104 are components of wireless sensor 100 that could be used for various applications. For example, it can be used in robotics, automated automobiles, helmets, and etc.

Control processor 109 is for processing information received from receiver 104 through receive antenna 101. Control processor 109 typically utilizes appropriate hardware and software algorithm to properly process the information.

Wireless sensor can be any wireless transceiver that is able to wirelessly transmit communication signals, such as short coded pattern. Wireless sensor is disposed on any physical platform that is conductive to effectively transmit the signals.

In one embodiment, transmit pattern through wireless network 100 are selected by control processor 109.

In one embodiment, communications through wireless network 100 are by a transmit antenna 102 and a received antenna 101. Transmit and receive antennas are physically separated to provide sufficient isolation between transmit and receive antennas.

In one embodiment, communications through wireless network 100 are transmitted by a transmit antenna 102.

In one embodiment, communications through wireless network 100 are received by a receive antenna 101.

In one embodiment, communications through wireless network 100 are transmitted and received by a single antenna. In general at any specified period of time the antenna is selected by a switch and/or a circulator.

Control Processor 109 has a variety of functions. In general, control processor 109 is utilized for signal processing, calculation, estimation, activities, methods, procedures, and tools that pertain to the operation, administration, maintenance, and provisioning of wireless sensor. In one embodiment, control processor 109 includes a database that is used for various applications. The database can be utilized for analyzing statistics in real-time.

Control processor 109 also has a variety of thresholds. In general, control processor 109 provides controls to various components that are connected to it. Moreover, control processor 109 is a high capacity communication facility that connects primary nodes.

In one embodiment the wireless sensor 100 is a transceiver that periodically switches between transmission and reception. During transmission a signal is transmitted and during the reception period the reflected signals from the surrounding environment objects are received. The received signal by receiver 104 is then sent to control processor 109 for further processing.

In one embodiment the wireless sensors 100 are microwave, or mili-metric wave transceivers.

In one embodiment wireless sensor 100 is controlled by control processor 109. The control processor 109 controls transmit pulse width and number of times a pulse is transmitted by wireless sensors 100. Control processor 109 also coordinates the transmit time and receive time period for the wireless sensors 100.

Figure 2:
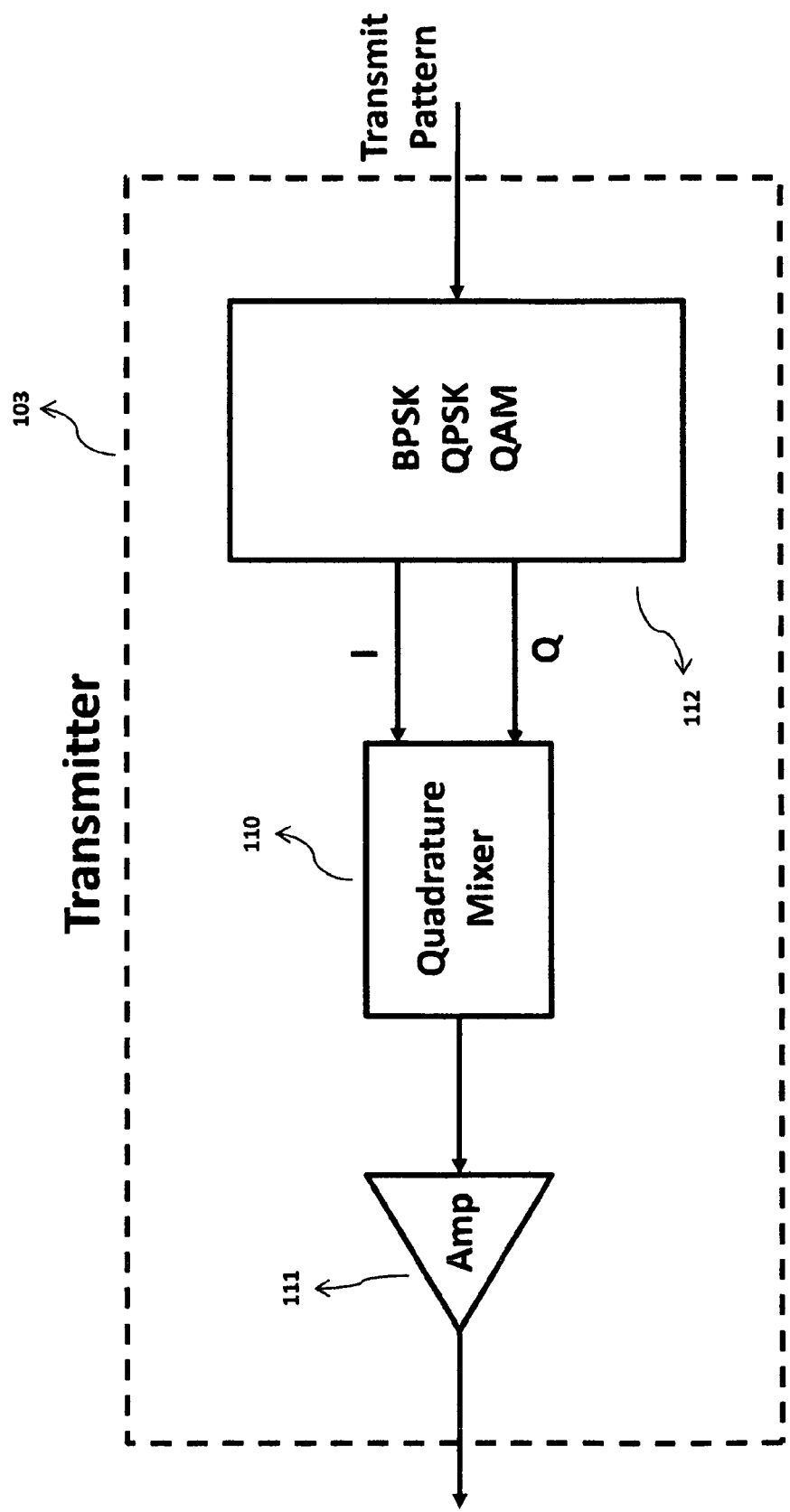
FIG. 2 illustrate embodiments of a wireless sensor transmitter.

FIG. 2 depicts an embodiment of wireless sensor transmitter 103 comprising of a modulator 112, a quadrature mixer 110 and an amplifier 111. In one embodiment, the transmitter 103 is configured to modulate the transmit pattern using one of modulation schemes such as BPSK, QPSK, QAM, and etc. In particular, the modulator 112 is able to process a longer transmit pattern by using higher level modulations.

In one embodiment, the output of transmit modulator 112 is either a real signal or a complex signal with in phase and quadrature phase components.

In one embodiment, the output of transmit modulator is up converted to carrier frequency by a quadrature up converter 110. The quadrature up converter 110 can be either a complex up converter or a real up converter.

In one embodiment, the up converted signal is amplified by an amplifier 111 before being transmitted.

Figure 3:
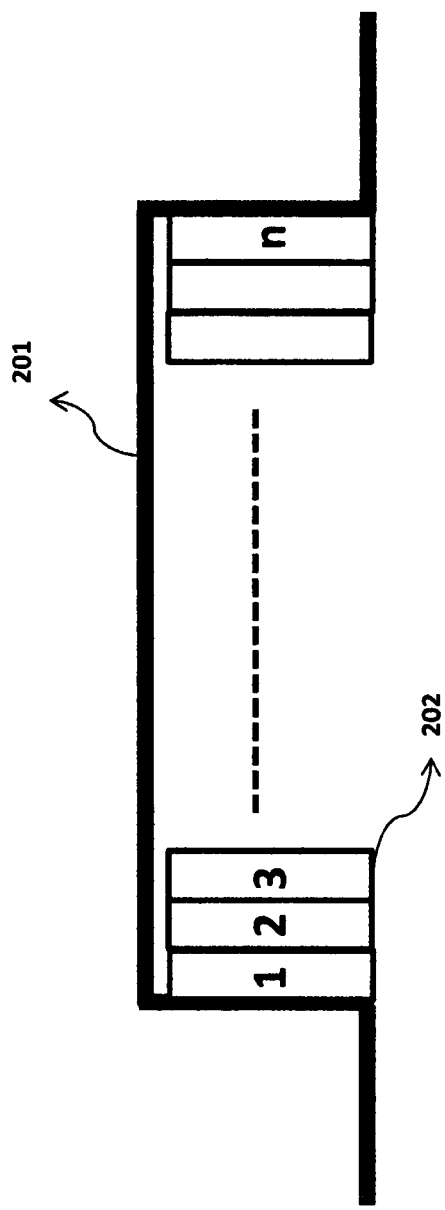
FIG. 3 illustrates embodiment s of transmitter signal for wireless sensor.

FIG. 3 depicts an embodiment of transmitter pattern. The transmit pattern has a durations 201 and a pattern 202.

In one embodiment, the duration 201 defines the accuracy of measurement of environment parameters.

In one embodiment, the size of the pattern 202 defines the accuracy of the receiver detection.

Figure 4:
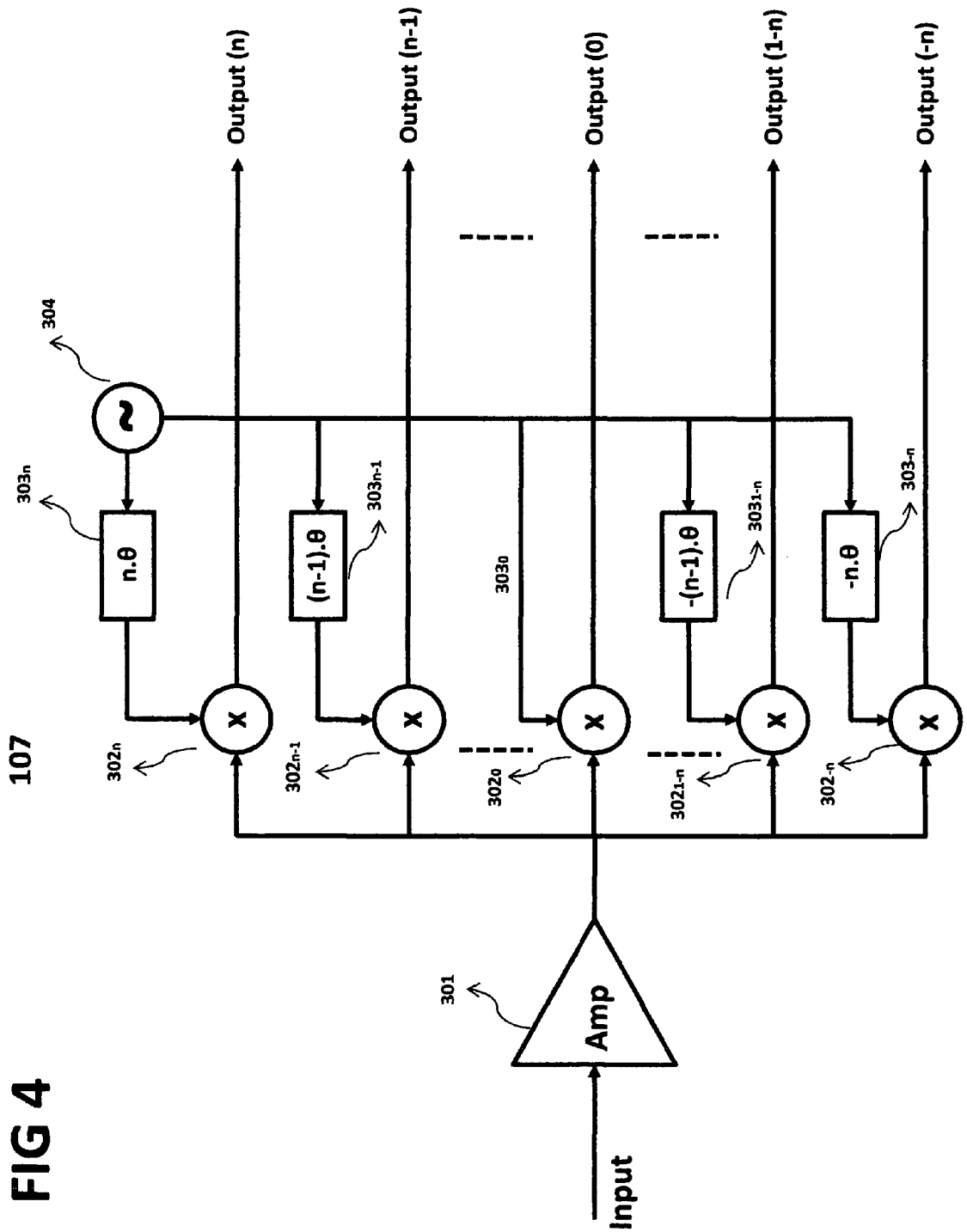
FIG. 4 illustrates embodiment of a receiver down convertor.

FIG. 4 depicts an embodiment of receiver down converter 107. In general, receiver down converter 107 facilitates in down converting the received signal to a baseband signal for detection. The down converter 107 comprises of an amplifier 301, a bank of mixers $302_{-n}$ to $302_n$, phase shifter $303_{-n}$ to $303_n$, and local oscillator 304. During the receive time the signal from antenna 101 is mixed with a local oscillator at the receive frequency to down converter the received signal to baseband signal.

In one embodiment, the received signal from receive antenna 101 is amplified by amplifier 301. The signal is amplified before being divided and applied to the down converter mixers $302_{-n}$ to $302_n$.

In one embodiment, the divided received signal and phase shifted local oscillator signals $303_{-n}$ to $303_n$ are mixed in mixers $302_{-n}$ to $302_n$ to produce baseband output (−n) to output (n).

In one embodiment, the local oscillator 304 is phase shifted by phase shifters $303_{-n}$ to $303_n$ before being applied to mixers $302_{-n}$ to $302_n$. The phase shift is in steps of θ. The value of θ is selected based on complexity and requirement for precision of receiver detection.

In one embodiment, the down converter 107 is a complex one with quadrature mixers 302-n to 302n and phase shifters $303_{-n}$ to $303_n$.

Figure 5:
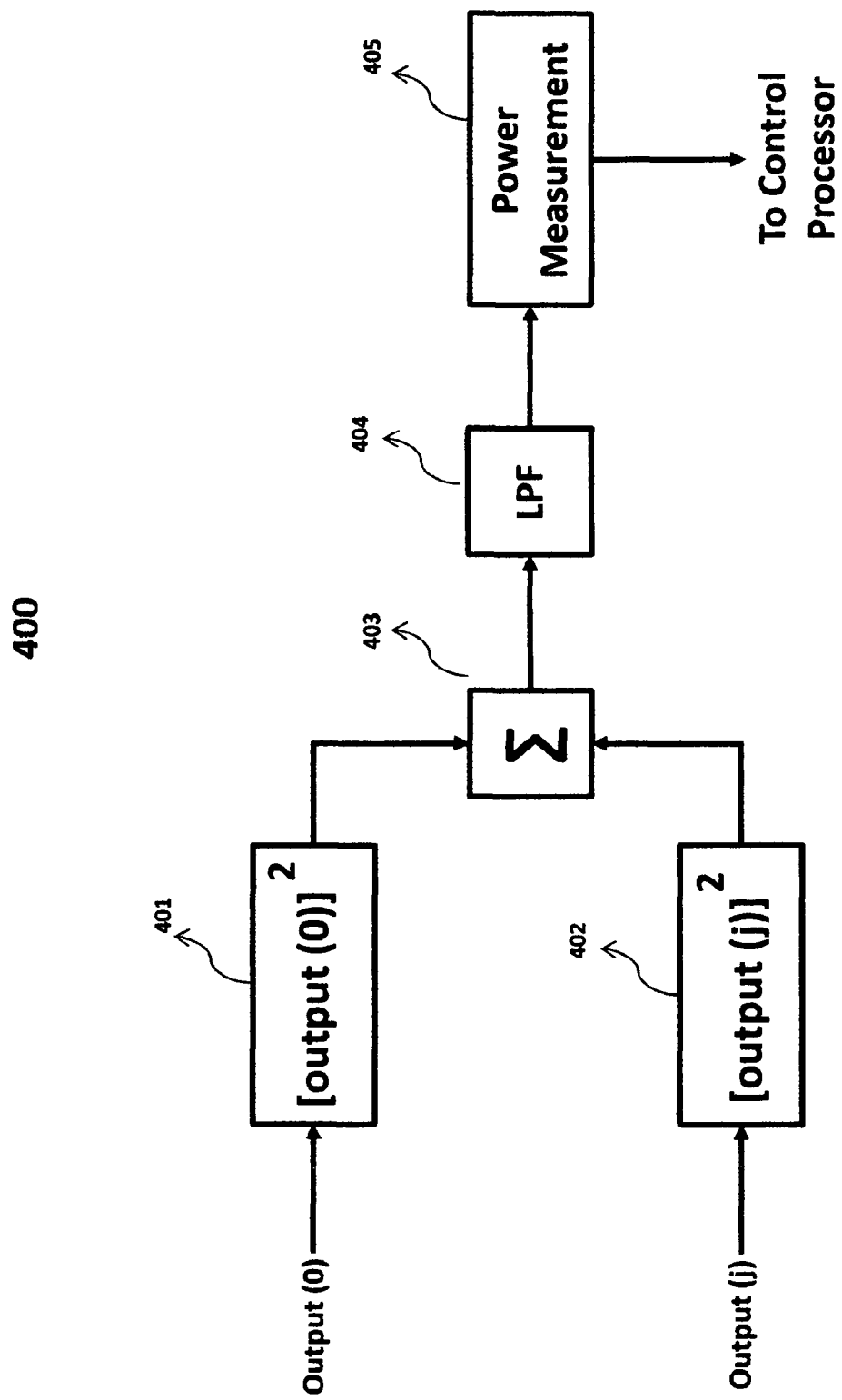
FIG. 5 illustrate embodiment of a receiver signal strength measurement.

FIG. 5 depicts an embodiment of receiver signal strength measurement 400. In general, receiver signal strength measurement 400 facilitates in identifying wanted signal from unwanted signal. The receiver signal measurement 400 comprises of squaring function 401 and 402, summation function 403, low pass filter 404 and power measurement function 405.

In one embodiment, the two input of the signal strength measurement 400 are 90 degree out of phase. The two inputs of signal strength measurement 400 are selected from the output of the down convertor 107.

In one embodiment, the two inputs of signal strength measurement 400 are squared by square functions 401 and 402. The squared signals are summed by summation function 403, and then averaged by low pass filter 404. The output of low pass filter 404 is used by power measurement function 405 to estimate and calculate the instantaneous power of receive signal. The power measurement 405 then sends the signal strength information to control processor 109.

Figure 6:
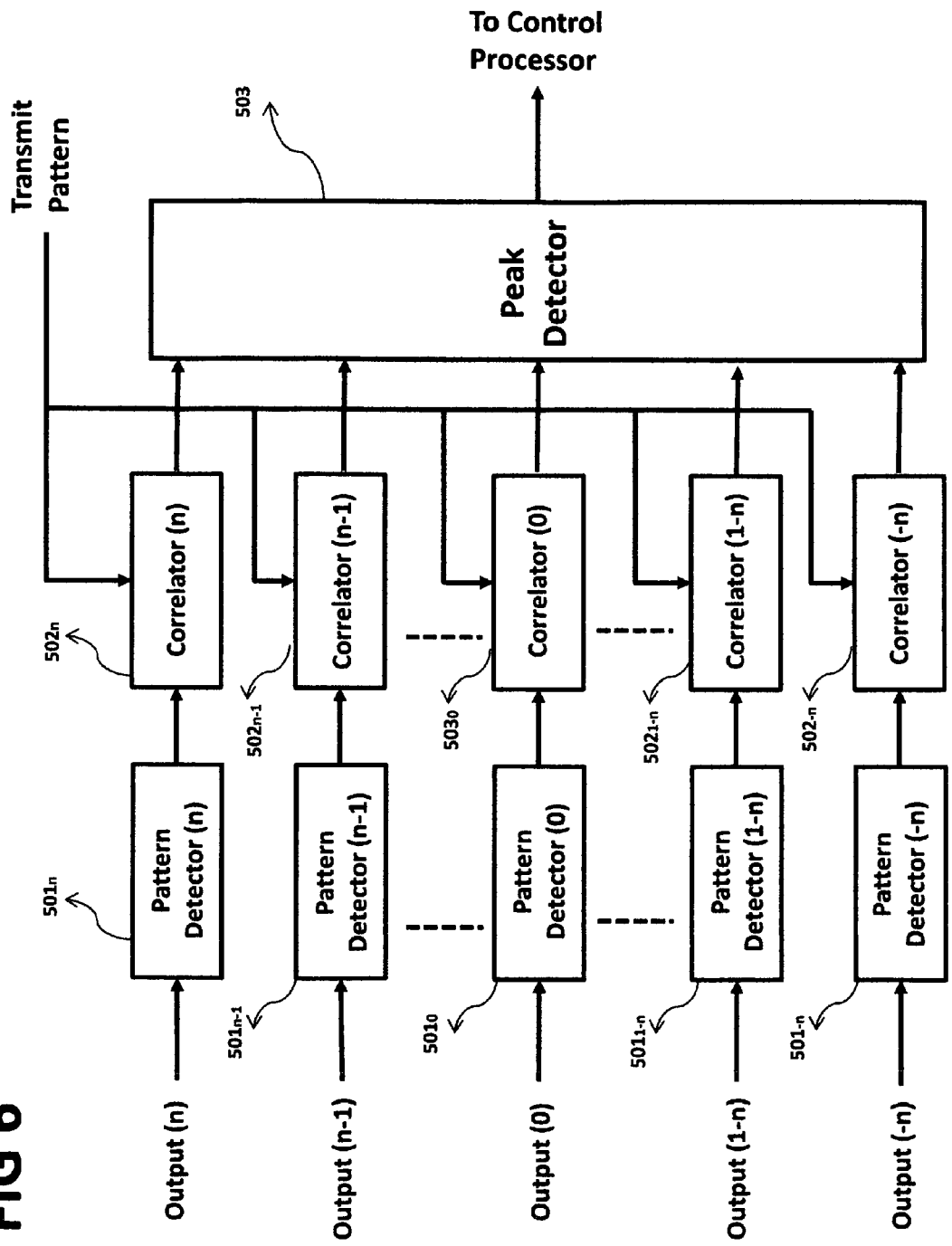
FIG. 6 illustrate embodiment of a receiver detector.

FIG. 6 depicts an embodiment of receiver detector 108. In general, detector 108 facilitates in detecting transmit pattern. The detector 108 comprises of a bank of level detectors $501_{-n}$ to $501_n$, a bank of correlators $502_{-n}$ to $502_n$, and a peak detector 503.

In one embodiment, each detector $501_{-n}$ to $501_n$ is an array of level detectors to detect multi-level modulation signals. The output of the level detector is a logic zero or one if the signal is two levels or logic of multiple zero or ones if the signal is multi-level modulated. The output of each detector $501_{-n}$ to $501_n$ is a pattern.

In one embodiment, a bank of correlators $502_{-n}$ to $502_n$ compares output of each detectors $501_{-n}$ to $501_n$ with the transmit pattern to find a match. When a match is detected from one or more of the detectors a peak is identified by the peak detector 503. The peak detector 503 sends this information to control processor 109.

Figure 7:
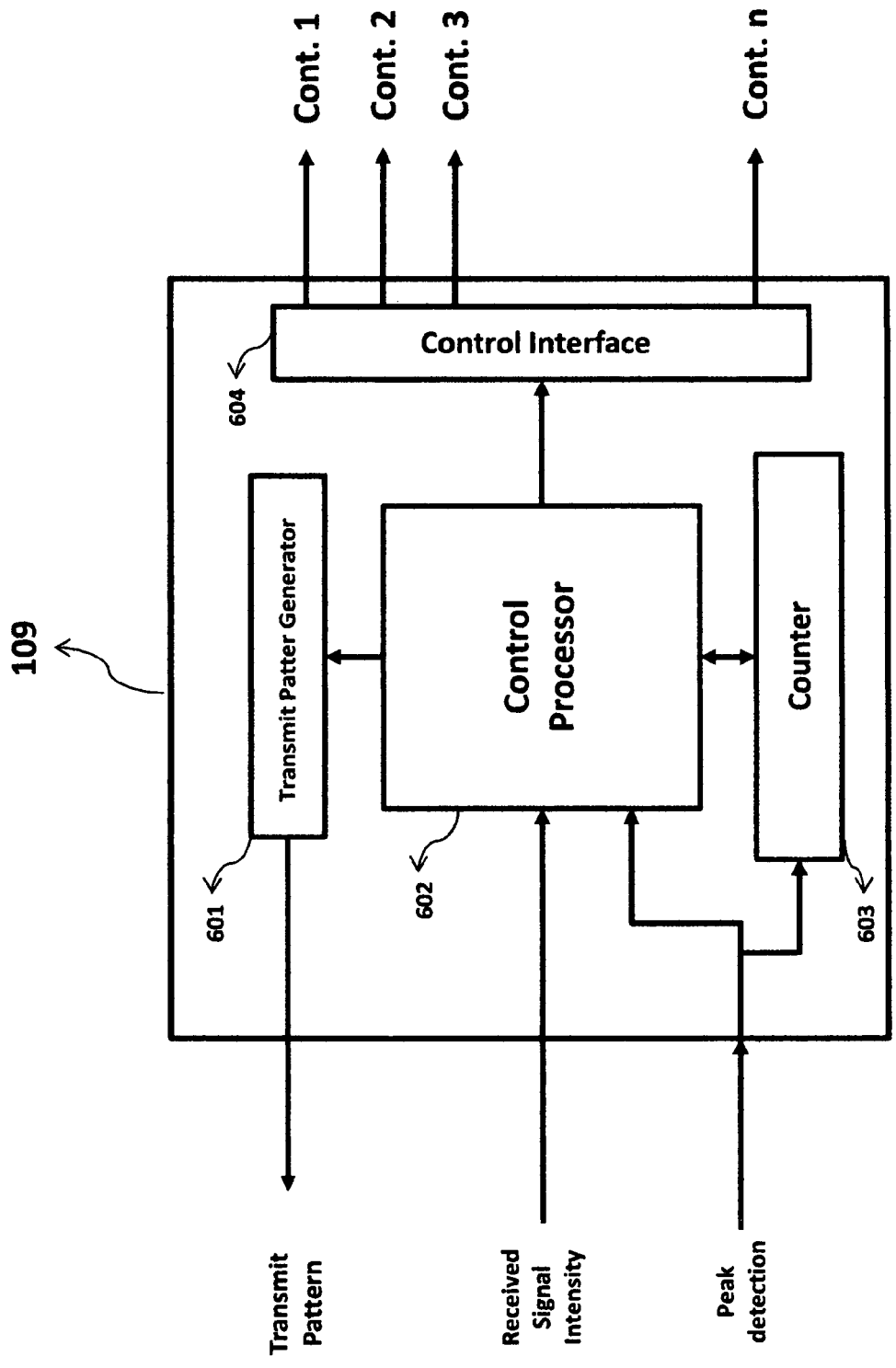
FIG. 7 illustrate embodiments of a control processor for a wireless sensor

FIG. 7 depicts an embodiment of control processor 109. In general, control processor 109 facilitates in estimating and calculating various environmental parameters. The control processor 109 comprises of a transmit pattern generator 601, a counter 603, a control interface 604 and a processor 602.

In one embodiment, the control processor 109 generates the transmit pattern through pattern generator 601 and send it to transmitter for transmission.

In one embodiment, the control processor 109 through a counter 603 controls all the timings including transmit time, time of power measurement, time of matching of transmit patterns with receive pattern.

In one embodiment, the processor 602 uses all the timing information, receive signal strength and peak detector output to estimate and calculate various environmental parameters.

In one embodiment, the processor 602 based on the estimated and calculated parameters activate various control signals to be used by peripheral objects to wireless sensor 100.

Figure 8:
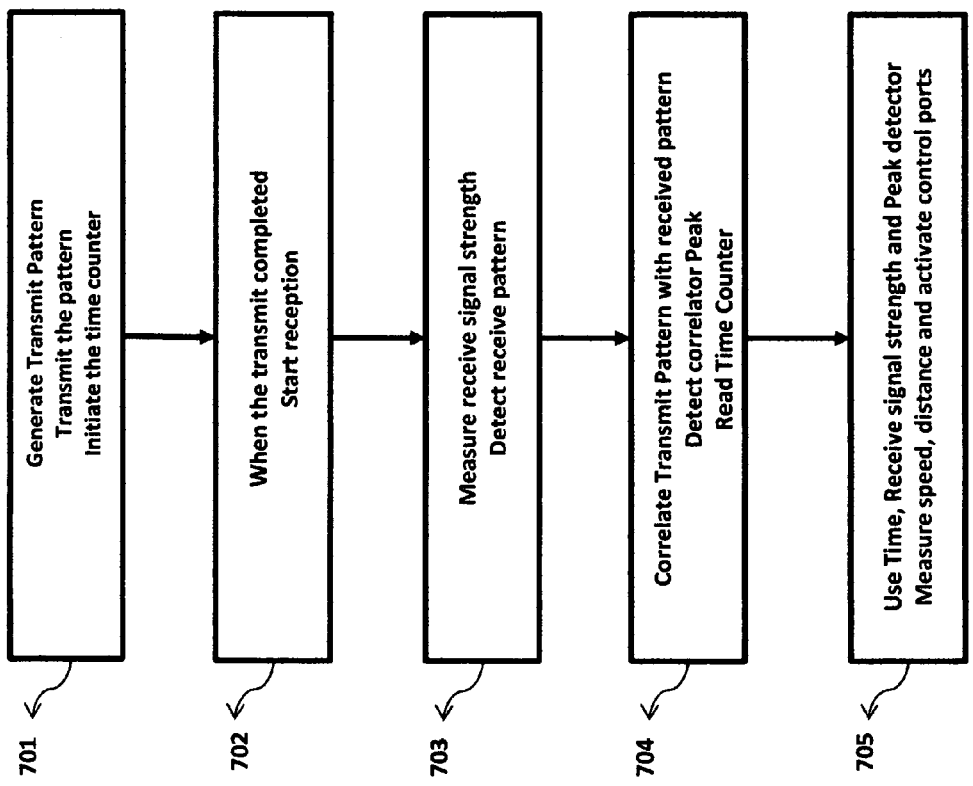
FIG. 8 illustrate embodiments of a flow chart of wireless sensor functions.

FIG. 8 depicts an embodiment of method 700 for using a wireless sensor to estimate and calculate environmental parameters. In various embodiments, method 700 is carried out by processor and electrical circuit under the control of a processes or executable instructions. The readable and executable instructions reside, for example, in a data storage medium such as processor usable volatile and non-volatile memory. However, the readable and executable instructions may reside in any type of processor readable storage medium. In some embodiments, method 700 is performed at least by one of the circuits described herein.

At 701 of method 700, a transmit pattern is generated, the pattern is transmitted and a timing counter is initiated. For example, transmit pattern is generated in control processor 109 and then is modulated and up converted to radio frequency in transmitter 103 before being transmitted by transmit antenna 102. The timing counter 603 in control processor 109 is initiated at the start of transmission which starts from control processor 109.

At 702 of method 700, the transmit pattern transmission is completed, and then the wireless sensor switches to reception. For example, when the counter 603 indicates the end of transmission then the transmitter 103 is turned off and the receiver 104 is turned on.

At 703 of method 700, the receiver 104 starts down conversion and detection. For example, the receive signal from receive antenna 101 is used by receiver 104 to down convert by a bank of down converter $501_{-n}$ to $501_n$, measure receive signal strength and sends the information to control processor 109 for further processing.

At 704 of method 700, the receiver 104 starts down conversion and detection of transmit pattern. For example, detected signals from output of the bank of detectors $501_{-n}$ to $501_n$ are correlated with transmit pattern by a bank of correlator $502_{-n}$ to $502_n$ to detect the transmit pattern. A peak detector 503 is used to detect the matched transmit pattern and then an indicator signal is sent to control processor 109.

At 705 of method 700, the control processor starts estimation and calculation of various environmental parameters. For example the power measurement results from power measurement function 400, the peak detector indication signal from detector 108 and timing information from timing counter 603 are used to estimate and calculate various parameters from environment.

Various embodiments are thus described. While particular embodiments have been described, it should be appreciated that the embodiments should not be construed as limited by such description, but rather construed according to the following claims.

The invention claimed is:

1. A precision wireless sensor comprising:
   a computing and control device with memory to generate random predefined patterns to be used by the transmitter, store various transmit information, store receive peak detection time, store measured receive signal strength intensity information, store various required thresholds information, and use the stored information to estimate and calculate certain environmental parameters surrounding the wireless sensor in order to activate certain peripheral devices;
   a wireless transceiver comprising:
      a transmitter to modulate a predefined pattern signal received from the computing and control device with memory, up convert the modulated signal to a carrier signal, and transmit using an antenna;
      a single receive antenna to receive the reflected transmit signals;
      a single receiver to detect the reflected transmit signals from various objects in wireless sensor's surrounding environment comprising:
         a bank of "N" independent down converters using a single local oscillator with a bank of "N" independent phase shifters using an increment "θ" to down convert the received carrier signal to a bank of "N" independent baseband signals, where "N" is an integer number represented by "2N+1"; a bank of "N" independent detectors to use the bank of "N" independent baseband signals and create a bank of "N" independent detected patterns;
         a bank of "N" independent corrolators to correlate the bank of "N" independent detected patterns with predefined transmit pattern and send the outputs to a peak detector; a peak detector to identify a peak when a match is detected by one or more correlators and send an indicator signal to the computing and control device with memory.

2. The precision wireless sensor of claim 1, wherein said pre-defined transmit signal can be a random, coded, scrambled pattern.

3. The precision wireless sensor of claim 1, wherein said wireless receiver uses two outputs of the bank of down converter with 90 degree phase shift to measure the received signal strength intensity.

4. The precision wireless sensor of claim 1, wherein said computing and control device with memory uses a time counter to determine the start of transmission time, end of transmission time, start of reception time, and time of transmit pattern detection by one of the correlators in the receiver.

5. The precision wireless sensor of claim 1, wherein said computing and control device with memory uses the recorded time data from the time counter and the receive signal strength intensity information to estimate and calculate wireless sensor's environment parameters.

6. The precision wireless sensor of claim 1, wherein said computing and control device with memory uses the estimated environmental parameters and the stored threshold values to decide if a peripheral device needs to be activated.

7. The precision wireless sensor of claim 1, wherein said bank of "N" independent phase shifters uses an increment phase shift "θ", where "θ" is determined by precision and accuracy of wireless sensor.

8. The precision wireless sensor of claim 1, wherein said wireless sensor transceiver is a microwave, mili-metric, or Infra-Red transceiver.

9. The precision wireless sensor of claim 1, wherein said computing device with memory can be an application specific signal processor (ASSP), a multi-core CPU, a digital signal processor (DSP), or a field programmable gate array (FPGA).

* * * * *